(12) United States Patent
Ayette et al.

(10) Patent No.: US 7,861,341 B2
(45) Date of Patent: Jan. 4, 2011

(54) RESTRAINT WITH SHOULDER HARNESS ADJUSTER

(75) Inventors: Michael W. Ayette, Noblesville, IN (US); Guy R. Dingman, Lafayette, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 633 days.

(21) Appl. No.: 11/624,039

(22) Filed: Jan. 17, 2007

(65) Prior Publication Data

US 2008/0168603 A1    Jul. 17, 2008

(51) Int. Cl.
*A47B 7/00* (2006.01)

(52) U.S. Cl. ............... 5/621; 5/628; 5/655; 297/250.1; 297/484

(58) Field of Classification Search .............. 5/621, 5/628, 655; 297/250.1, 484
See application file for complete search history.

(56) References Cited

U.S. PATENT DOCUMENTS

| | | | |
|---|---|---|---|
| 4,720,148 A * | 1/1988 | Anthony et al. | ............. 297/474 |
| 4,977,630 A | 12/1990 | Oswalt et al. | |
| 5,014,724 A | 5/1991 | Miller | |
| 5,031,962 A * | 7/1991 | Lee | ............. 297/484 |
| 5,061,012 A | 10/1991 | Parker et al. | |
| 5,158,337 A | 10/1992 | Leggett | |
| 5,283,919 A | 2/1994 | Grant | |
| 5,398,997 A * | 3/1995 | McFalls | ............. 297/476 |
| 5,400,448 A | 3/1995 | Zwickey | |
| 5,496,092 A * | 3/1996 | Williams et al. | ......... 297/250.1 |
| 5,845,351 A | 12/1998 | Berta et al. | |
| 5,860,176 A | 1/1999 | Norberg | |
| 6,089,662 A * | 7/2000 | Lambert et al. | ............. 297/238 |
| 6,155,638 A * | 12/2000 | Bapst | ......... 297/250.1 |
| 6,447,060 B1 | 9/2002 | Vila et al. | |
| 6,471,298 B2 | 10/2002 | Carine et al. | |
| 6,491,348 B1 * | 12/2002 | Kain | ............. 297/484 |
| 6,588,849 B2 * | 7/2003 | Glover et al. | ............. 297/467 |
| 6,623,074 B2 * | 9/2003 | Asbach et al. | ......... 297/250.1 |
| 6,688,685 B2 * | 2/2004 | Kain | ......... 297/250.1 |
| 6,898,811 B2 | 5/2005 | Zucker et al. | |
| 7,387,336 B2 * | 6/2008 | Sakumoto | ......... 297/250.1 |
| 7,547,065 B2 * | 6/2009 | Barger | ......... 297/250.1 |

* cited by examiner

*Primary Examiner*—Robert G Santos
*Assistant Examiner*—Nicholas Polito
(74) *Attorney, Agent, or Firm*—Woodard Emhardt Naughton Moriarty McNett & Henry LLP

(57) ABSTRACT

A restraint for holding a person atop a gurney or on a vehicle seat. A harness includes a pair of straps slidably mounted to a main frame. The straps are connected to an adjuster. A slide plate is mounted to the frame with the straps extending therethrough. A spring loaded device normally positions the plate to position the straps apart from the shoulders of a person positioned beneath the straps until the straps are pulled relative to an adjuster moving the plate and the straps adjacent the shoulders of the person.

12 Claims, 15 Drawing Sheets

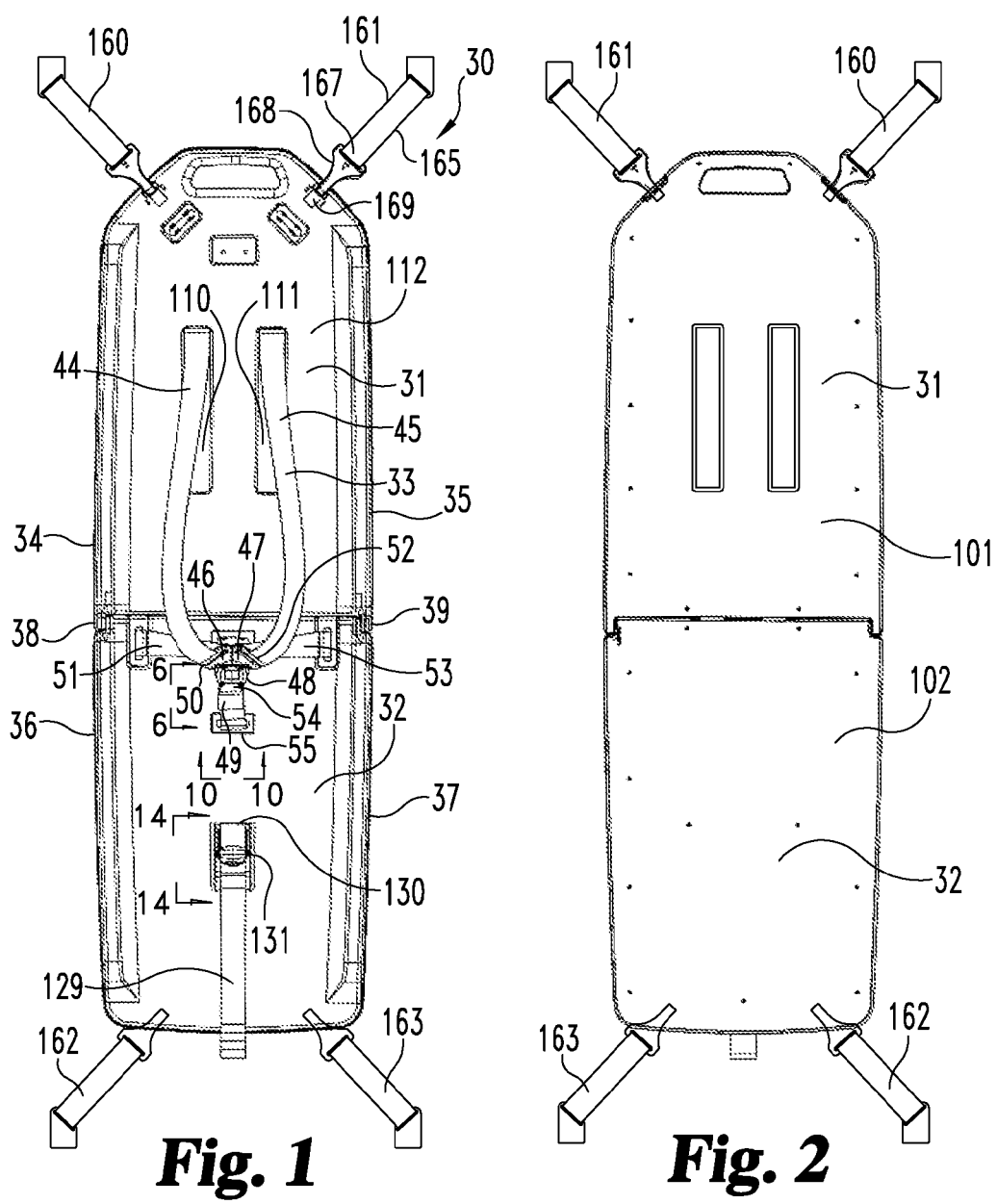

RESTRAINT WITH SHOULDER HARNESS ADJUSTER

BACKGROUND OF THE INVENTION

1. Field of the Invention

The present invention relates generally to the field of restraints for holding a person on an emergency vehicle bed or a child seat positionable atop a vehicle passenger seat.

2. Description of the Prior Art

A variety of harnesses are utilized to restrain patients on emergency gurneys and children atop vehicle seats. A constant problem is that the harness must be manually sized depending upon the shape and size of the patient or child. For example, in a five point harness assembly, the shoulder straps must be positioned to extend adjacent the person's shoulders and then tightened to limit movement of the person. A typical five point harness is shown in U.S. Pat. No. 5,158,337 which consists of a pair of lap belts, two opposite over-the-shoulder straps and a crouch strap which are connected together by a belt/tongue combination.

Typically, in a five point harness assembly, the pair of shoulder straps extend through slots in the back support and are removably connected to a t-bar or t-plate in turn connected to a third strap extending through a web adjuster operable to tighten or loosen the third strap and thus the shoulder straps. Such an approach is shown in U.S. Pat. No. 6,471,298 issued to Caring et al. In the Caring et al. device, a row of slots are located on the back support. The shoulder straps are removed from the t-bar and then manually threaded through the slots in order to size the straps to the person resting against the back support. The shoulder straps are then attached once again to the t-bar.

In order to avoid the necessity of unhooking the shoulder straps from the t-bar and then manually feeding the straps through the particular slots depending upon the size of the person, various approaches have been utilized to facilitate the sizing of the harness. For example, in the U.S. Pat. No. 6,898,811 issued to Zucker et al., an emergency transport used for pediatric patients is disclosed having the top ends of the shoulder straps with buckles mounted thereon that are engaged with tongues or anchors located at each slot along the row of slots provided on the back support. Thus, in order to size the harness, the buckles on each shoulder strap are manually positioned and locked to the particular anchors. In addition, belt buckles are provided along the length of the straps to manually adjust the length of the straps.

A further approach to sizing the harness is disclosed in U.S. Pat. No. 5,496,092 issued to Williams et al. In the Williams et al. device, a pair of shoulder straps extend through a pair of slots provided on a movable plate located on the front of the back support. The movable plate rides on rails and may be moved along the length of the back support thereby positioning the slots at the desired location so that the shoulder straps may extend against the patient's shoulders. The harness is then tightened by means of a third strap attached to the pair of straps with the third strap being fed through a web adjuster. Thus, in order to size the Williams et al. harness, one must place the patient beneath the shoulder straps and manually move the movable plate to the desired location and then pull on the third strap to tighten the harness.

In U.S. Pat. No. 6,447,060, there is disclosed a back support having a pair of top slots and bottom slots interconnected by narrow channels. The shoulder straps may be manually moved from the top slots to the bottom slots and vice-versa by turning the straps on edge and moving the straps through the channels to the chosen slots.

Disclosed herein is a harness adjustment system that avoids the necessity of manually feeding the shoulder straps through different slots in the back support or for manually moving a plate having the slots thereon prior to tightening the harness. Likewise, the approach of manually mounting the top ends of the shoulder straps to particular locations along the length of the back support is avoided. The harness system disclosed herein provides automatic positioning of the shoulder straps as the harness is loosened or tightened. More specifically, by loosening the harness assembly, the shoulder straps automatically move apart from the person's shoulders and by tightening the harness straps, the shoulder straps move and are positioned adjacent the person's shoulders.

The harness system disclosed herein may be used in a variety of different applications including cots or mattresses positioned atop a gurney or other applications, such as, a child seat. The harness system is particularly advantageous in that the system can be incorporated into a gurney or may be an add on feature by incorporating the harness into a mattress or pad which is then subsequently mounted to a gurney.

Other samples of prior approaches include U.S. Pat. No. 5,845,351 which discloses a stretcher table mountable over an ambulance stretcher. A foldable trauma stretcher is disclosed in U.S. Pat. No. 5,283,919. A mattress having a three point restraint is provided on an ambulance gurney disclosed in U.S. Pat. No. 5,400,448. A board for use in moving a small child having multiple slots for extending the shoulder straps through for sizing is mountable to a wheeled patient mover as disclosed in U.S. Pat. No. 4,977,630. A pediatric immobilization structure is disclosed in U.S. Pat. No. 5,014,724 having shoulder straps that extend over the patient. Further, a pediatric transport device disclosed in U.S. Pat. No. 5,860,176, has shoulder straps sized by adjustment of standard buckles.

SUMMARY OF THE INVENTION

A restraint system for releasably holding a person on a support having a main frame. The main frame has a back support for supporting the back of the person and a seat support for supporting the seat of the person. A pair of shoulder straps extend outwardly from the back support and are positionable over the person. A shoulder strap connector means is associated with the pair of straps. A crotch connector is mounted to the frame with the shoulder strap connector means and the crotch connector connectable together to releasably hold the shoulder straps to the crotch connector. An adjustment means is connected to the shoulder straps operable to allow a selected amount of extension and operable to allow a selected amount of retraction of the straps to respectively loosen and tighten the straps and further operable to limit extension. A shoulder strap positioner means is connected to the shoulder straps to automatically move with the shoulder straps and position the shoulder straps at a first location away from the person when the adjustment means is operated to loosen a selected amount of the shoulder straps and to automatically move with the shoulder straps and position the shoulder straps at a second location against the shoulders of the person when the adjustment means is operated to retract a selected amount of the shoulder straps.

It is an object the present invention to provide a restraining system for use with a gurney which automatically positions shoulder straps relative to the patient.

A further object of the present invention is to provide a restraining system for use with a child seat which automatically positions shoulder straps relative to the child.

Related objects and advantages of the present invention will be apparent from the following description.

BRIEF DESCRIPTION OF THE DRAWINGS

FIG. 1 is a plan view of the preferred embodiment of the restraint.

FIG. 2 is a rear view of the restraint.

DESCRIPTION OF THE PREFERRED EMBODIMENTS

Figure 3:
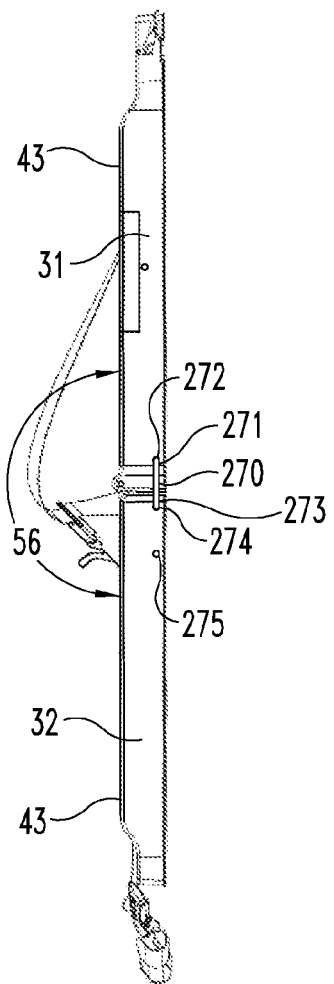
FIG. 3 is a right side view of the restraint.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is shown an emergency vehicle child restraint 30 having a back support 31 and a seat support 32 pivotally connected together. A harness assembly 33 composed of multiple straps is movably mounted to restraint 30 and designed to restrain a person atop the restraint. Restraint 30 is particularly useful in holding a child or small person whose weight may be over a large range, such as from 22 pounds to 100 pounds. A particular unique feature to be described is a shoulder adjustment that positions the straps of harness 33 immediately adjacent the shoulders of the person regardless of the height of the person.

Figure 5:
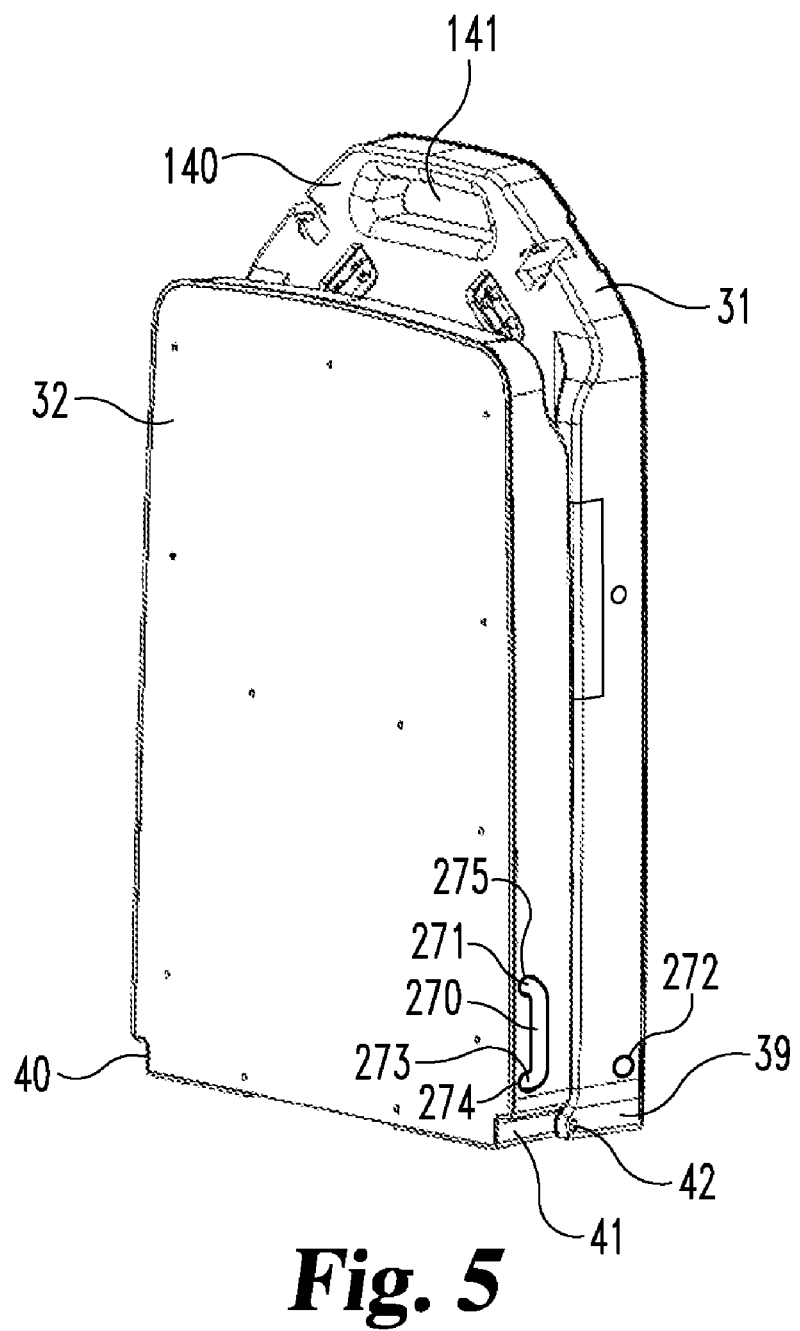
FIG. 5 is a perspective view of the restraint in a folded condition for transport and storage.

Back support 31 has a main frame including a pair of longitudinally extending side rails 34 and 35 aligned with the longitudinally extending side rails 36 and 37 of the main frame of seat support 32. The ends of rails 34 and 35 form respectively, mutually opposed flanges 38 and 39 that extend over and adjacent the indented ends 40 and 41 (FIG. 5) of rails 36 and 37. A pin or rod 42 extends through flanges 38 and 39 and into the indented ends 40 and 41 providing a pivotal or hinge connection between the back support 31 and seat portion 32. Thus, supports 31 and 32 may be pivoted from the in-use position wherein the supports 31 and 32 are aligned to provide a flat surface upon which the person may rest, shown in FIG. 3, to a folded condition, as shown in FIG. 5. Back support 31 is longer than seat support 32 forming a handle extension 140 with hole 141 extending therethrough allowing the restraint to be grasped and carried.

Figure 18:
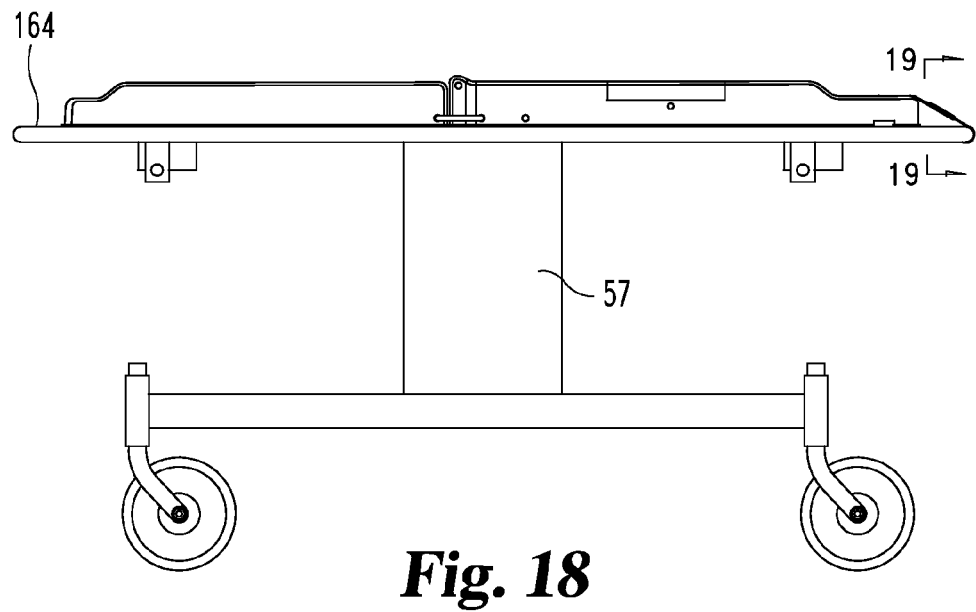
FIG. 18 is a side view of a gurney having the restraint of FIG. 1 mounted thereon.

The outwardly facing or top surfaces 43 (FIG. 3) of back support 31 and seat support 32 form an included angle 56 that may be varied from 180 degrees (FIG. 3) to the stored position (FIG. 5) wherein angle 56 is zero degrees. Further, the back support portion 31 and seat support portion 32 may be pivoted to angles between zero and 180 degrees depending upon the need for supporting the person positioned atop supports 31 and 32. Restraint 30 is designed to rest atop a commercially available cot or gurney 57 (FIG. 18) that may be adjusted to the appropriate position and angle thereby supporting restraint 30 at the desired angle 56.

A C-shaped hinge lock 270 (FIG. 3) is pivotably mounted to seat support 32 and has a distal end 271 positionable in hole 272 provided in the side of the frame of back support 31 and a proximal end 273 pivotally mounted in hole 274 provided in the side of the frame of seat support 32. When the back support 31 and seat support 32 are moved relative to each other, lock 270 is first pulled outwardly disengaging end 271 from hole 272 allowing the back support 31 and seat support 32 to be pivoted. When lock 270 is not used to limit movement of back support 31 and seat support 32, the distal end 271 may be positioned in storage hole 275 provided in the side of the frame of seat support 32. Holes 272, 274, and 275 may be positioned to allow the lock to secure supports 32 and 32 in the in-use position of FIG. 3 or the folded-stored position of FIG. 5.

Harness 33 includes a pair of shoulder straps 44 and 45 that extend slidably through a pair of seat belt buckle tongues 46 and 47. A variety of tongues may be used. For example, U.S. Design Pat. D342,465 discloses a pair of tongues that may be utilized with the present invention. U.S. Design Pat. D342, 465 is herewith incorporated by reference. Belt buckle tongues 46 and 47 are releasably lockable with a conventional seat belt buckle 48 mounted to strap 49, in turn, mounted to seat support 32. A variety of buckles may be used for buckle 48. For example, U.S. Pat. No. 5,038,446, herewith incorporated by reference, discloses a buckle for use with a dual or split tongue arrangement.

Strap 44 extends slidably and freely through slot 50 of tongue 46 having an end 51 fixedly mounted to seat support 32. Likewise, strap 45 extends slidably and freely through slot 52 of tongue 47 having an end 53 fixedly attached to seat support 32.

End 54 of strap 49 is fixedly secured to buckle 48 whereas the opposite end of strap 49 extends through opening 55 and is adjustably and movably mounted to seat support 32. Opening 55 may be elongated in the direction of the length of seat support 32 to allow strap 49 and buckle 48 to be positioned at different locations along the length of bed support 32. A variety of means may be used to mount buckle 48 via strap 49 to the seat support portion 32. Four such embodiments are illustrated in FIGS. 6-12.

Figure 6:
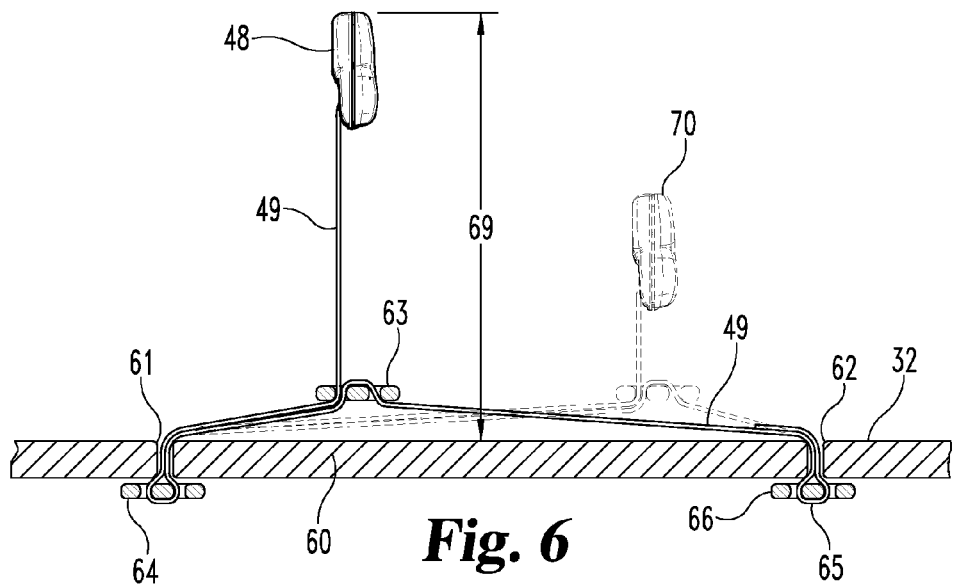
FIG. 6 is a fragmentary, enlarged, cross-sectional view taken along the lines 6-6 of FIG. 1 and viewed in the direction of the arrows illustrating one structure for mounting the buckle.

In FIG. 6, main frame 60 of seat support 32 includes a pair of slots 61 and 62 with slot 61 being located closer to back support 31 than slot 62. Buckle 48 is fixedly attached to strap 49 that extends through a standard buckle 63 and then via slot 61 to beneath main frame 60 whereat strap 49 extends slidingly through standard buckle 64. The strap then extends in the reverse direction through slot 61. The strap then extends through buckle 63 across the top surface of frame 60 to slot 62. Strap 49 extends downward through slot 62 having an end 65 fixedly attached to a third standard buckle 66 located beneath frame 60. Buckle 63, 64 and 65 are identical with buckle 63 being depicted in FIG. 9. Buckle 63 includes a pair of parallel slots 67 and 68 through which strap 49 extends.

By sliding buckle 63 along the length of main frame 60 between slots 61 and 62, the distance 69 between buckle 48 and the top surface of main frame 60 may be controlled as well as the location of buckle 48 along the length of frame 60 between slots 61 and 62. For example, by sliding buckle 63 from slot 61 towards slot 62, the distance 69 will be decreased as shown by the phantom lines 70 of the buckle. Further, the location of buckle 48 along the length of frame 60 likewise will be controlled. Thus, the location of buckle 48 may be controlled depending upon the size of the person positioned atop seat support 32 and back support 31.

Figure 7:
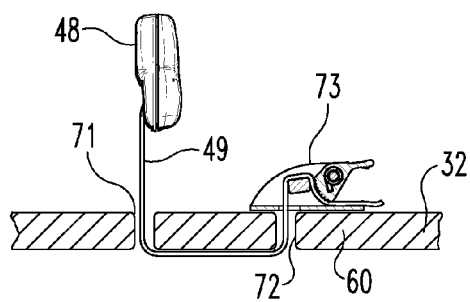
FIG. 7 is the same view as FIG. 6 only illustrating an alternate embodiment of the structure for mounting the buckle.

A second embodiment for mounting buckle 48 is shown in FIG. 7. Frame 60 of seat support 32 includes a pair of slots 71 and 72 with strap 49 first extending through slot 71 to beneath frame 60 and then back through slot 72 and through a web adjuster 73. By pulling strap 49 through web adjuster 73, the distance 69 of the buckle relative to the upwardly facing surface of seat support 32 may be controlled. A variety of web adjusters are commercially available. For example, U.S. Design Pat. D303,232 discloses one such web adjuster having a pivotable cam frictionally engaging the strap to hold the strap in place until the cam is pivoted to release the strap. U.S. Design Pat. D303,232 is herewith incorporated by reference. Another version of a web adjuster employs a push button to move the pivotable cam.

Figure 8:
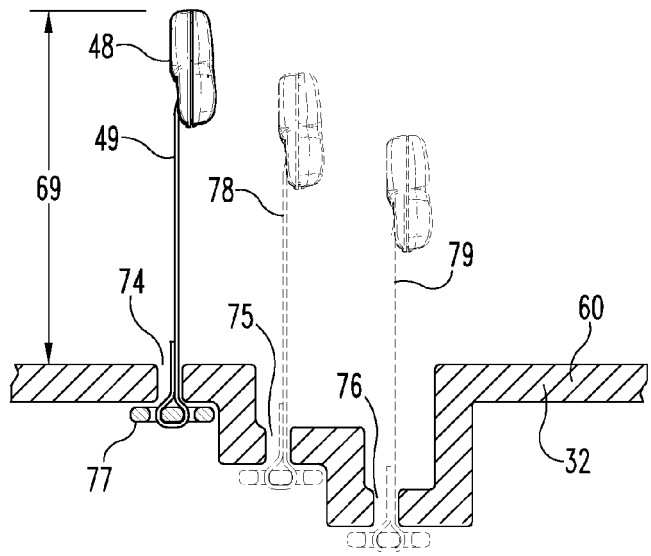
FIG. 8 is the same view as FIG. 6 only illustrating yet a further embodiment of the structure for mounting the buckle.
Figure 9:
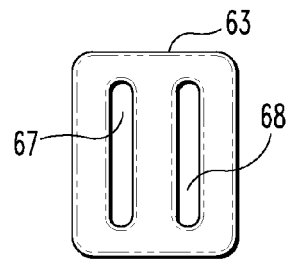
FIG. 9 is a plan view of the buckle 63 of FIG. 6.

A third embodiment for mounting buckle 48 by strap 49 is shown in FIG. 8. Frame 60 includes a plurality of slots 74, 75 and 76 through which strap 49 is extendable being fixedly mounted to buckle 77 which may be identical to buckle 63 previously described. Frame 60 is indented at slot 75 and 76 with the indentation being deeper at the location of slot 76 as compared to the location of slot 75. In order to position the strap 49 at the locations of slots 75 and 76, buckle 77 may be pivoted so as to slide upwardly through slot 74 thereby disengaging strap 49 from slot 74. Buckle 77 can then be inserted edge wise through either slot 75 or 76 depending upon the desired location until the buckle is positioned beneath frame 60 as illustrated by the dashed line positions 78 and 79. In the embodiment shown in FIG. 8, the distance 69 between buckle 48 and the top surface of frame 60 is decreased when the strap and buckle is moved from the location of slot 74 to either slot 75 or slot 76. Likewise, the location of buckle 48 along the length of seat support 32 may be adjusted from slot to slot.

Figure 10:
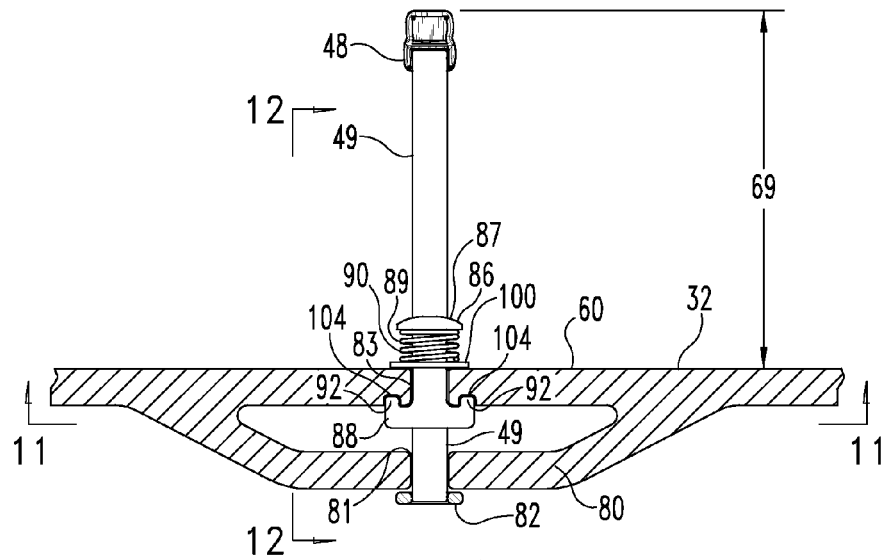
FIG. 10 is a fragmentary, enlarged, cross-sectional view taken along line 10-10 of FIG. 1 and reviewed in the direction of the arrows and illustrating yet a further embodiment of the structure for mounting the buckle.
Figure 11:
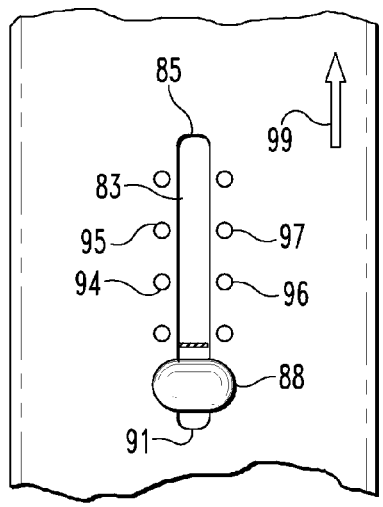
FIG. 11 is a fragmentary cross-sectional view taken along line 11-11 of FIG. 10 and viewed in the direction of the arrows.
Figure 12:
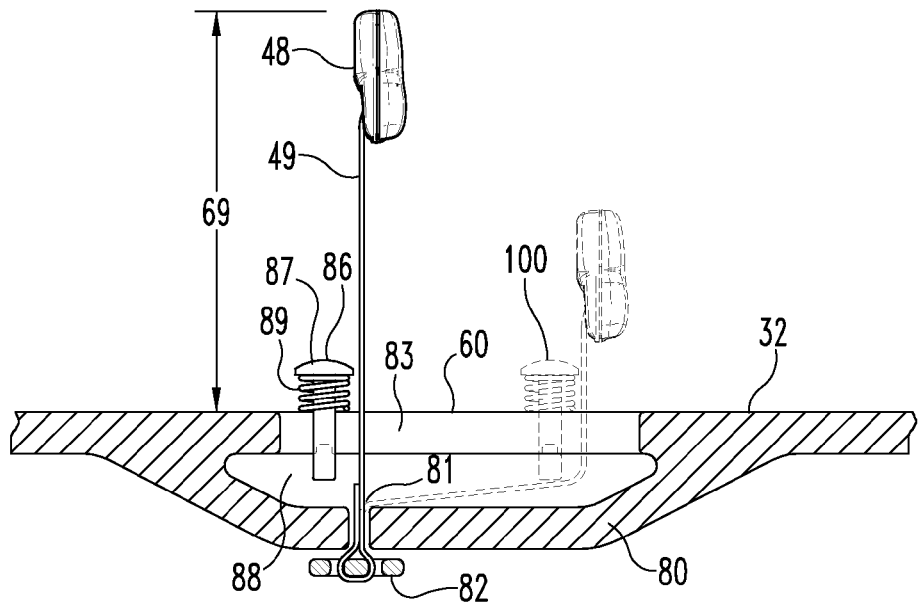
FIG. 12 is a side view looking in the direction of arrows 12-12 of FIG. 10.
Figure 13:
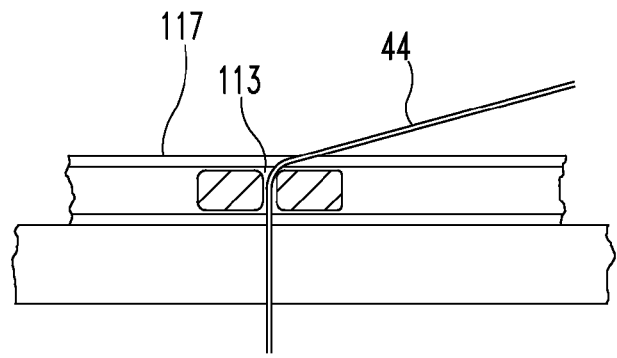
FIG. 13 is a fragmentary, enlarged, cross-sectional view of strap 44 and plate 113 viewed in the direction of the arrows 13-13 of FIG. 4.

Yet a further embodiment for mounting buckle 48 and strap 49 to seat support 32 is shown in FIGS. 10-12. Main frame 60 includes a bracket wall 80 fixedly secured thereto with wall 80 including a slot 81 through which strap 49 extends being fixedly attached at its bottom end to buckle 82 identical to buckle 63. A slot 83 (FIG. 11) extends in the direction of the length of main frame 60 allowing strap 49 to extend freely therethrough between the opposite ends 85 and 91 of slot 83. A spring biased adjuster 86 (FIG. 10) is movably mounted to frame 60 and includes a top button shaped end 87 and a bottom enlarged end 88. A helical spring 89 surrounds the shank 90 of adjuster 86 which joins together ends 87 and 88. Spring 89 extends from beneath the button shaped end 87 to a washer 100 atop the upwardly facing surface of the main frame of seat support 32. End 88 includes a pair of upwardly extending fingers 92 that are positionable within pairs of blind holes 104 located along the length of slot 83. For example, holes 94 and 96 form a pair of blind holes located on opposite sides of slot 83. Likewise, holes 95 and 97 form a second pair. By moving button shaped end 87 of adjuster 86 towards the top surface of the frame 60 of seat support 32, spring 89 will be compressed moving end 88 with fingers 92 of the adjuster downwardly from slot 83 allowing shank 91 to be moved along the length of the slot until end 87 is released. Thus, end 87 may be depressed and adjuster 86 moved in the direction of arrow 99 until the adjuster is positioned at the desired location along the length of the slot whereupon end 87 is released and fingers 92 engage mutually opposed blind holes.

Strap 49 is to the immediate right of the adjuster (FIG. 12) thereby moving buckle 48 to the right and toward to the upwardly facing surface of frame 60. Likewise, the adjuster can be moved to various locations along the length of the slot, such as at holes 95 and 97 until eventually the buckle is located at the desired length along the length of frame 60 and the desired distance 69 is obtained as shown by the dashed line location 100 of the adjuster.

Figure 4:
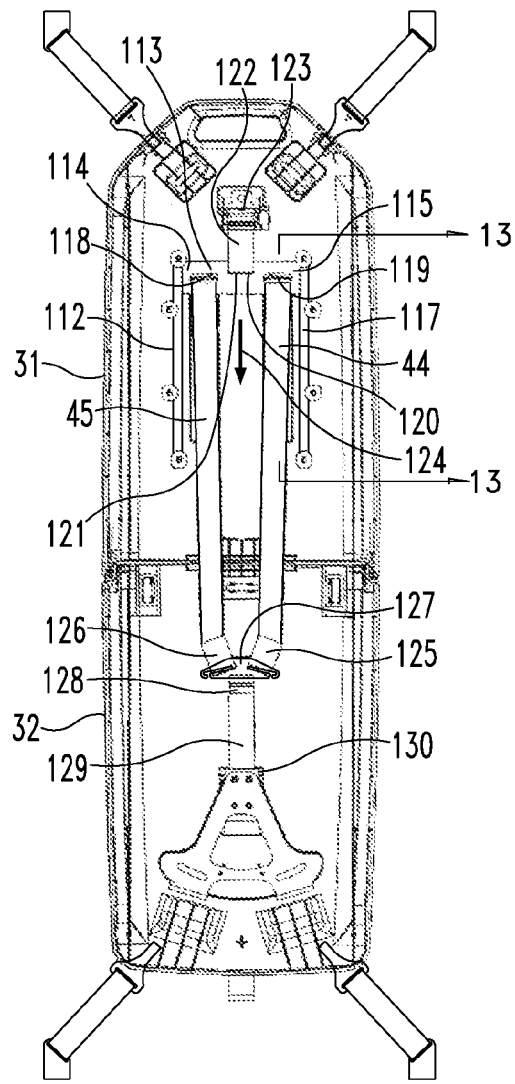
FIG. 4 is the same view as FIG. 2 with the back panels removed therefrom.

A pair of cover plates 101 and 102 (FIG. 2) are removably secured respectively to the back of back support 31 and seat support 32. The covers may be removed to facilitate access to the structure (FIG. 4) for positioning the straps 44 and 45 adjacent the top of the shoulders of the person positioned atop restraint 30. Straps 44 and 45 extend respectively through slots 110 and 111 of the main frame of back support 31 (FIG. 1) and then freely and slidably through respectively slots 119 and 118 of slidable plate 113 (FIG. 4). Straps 44 and 45 continue along the back side of the restraint having ends 125 and 126 fixedly secured to a conventional t-bar 127. Such t-bars are commercially available with one such t-bar disclosed in U.S. Design Pat. D285,386 herewith incorporated by reference.

A pair of guide rails 112 and 117 extend along the back of back support 31 and in the direction of the length of slots 110 and 111. The rails form recesses receiving the opposite ends 114 and 115 of movable plate 113. Slots 118 and 119 of movable plate 113 are aligned with respectively slots 111 and 110 through which the straps extend.

A spring biased spool 123 is mounted to back support 31 and includes an extendable and retractable strap 122 having its distal end 120 attached at slot 121 to movable plate 113. Spool 123 is operable to normally urge retraction of strap 122 and thus pull movable plate 113 upwardly toward the spool but is yieldable to allow the movable plate to move in the direction of arrow 124.

Figure 14:
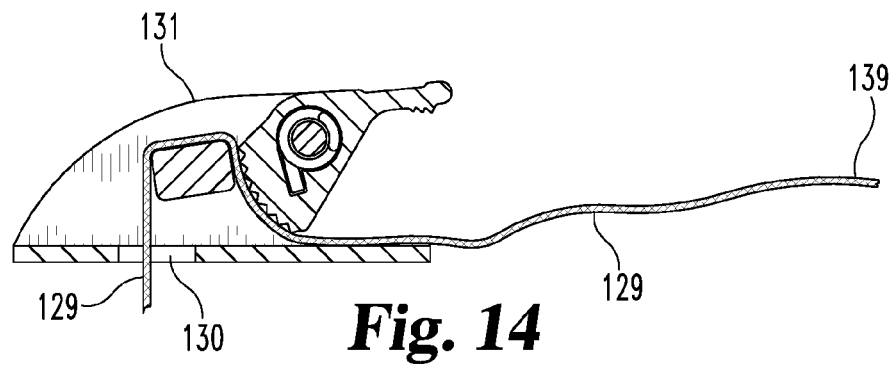
FIG. 14 is a fragmentary, enlarged, cross-section view taken along the line 14-14 of FIG. 1.

Strap 129 (FIG. 4) has a first end 128 fixedly attached to t-bar 127 with the strap extending through hole 130 of seat support 32 with the strap exiting the hole on the top surface of the seat support whereat the strap is engaged by a web adjuster 131 (FIGS. 1 and 14). The web adjuster may be the same as the adjuster 73 (FIG. 7) previously illustrated and described.

Figure 15:
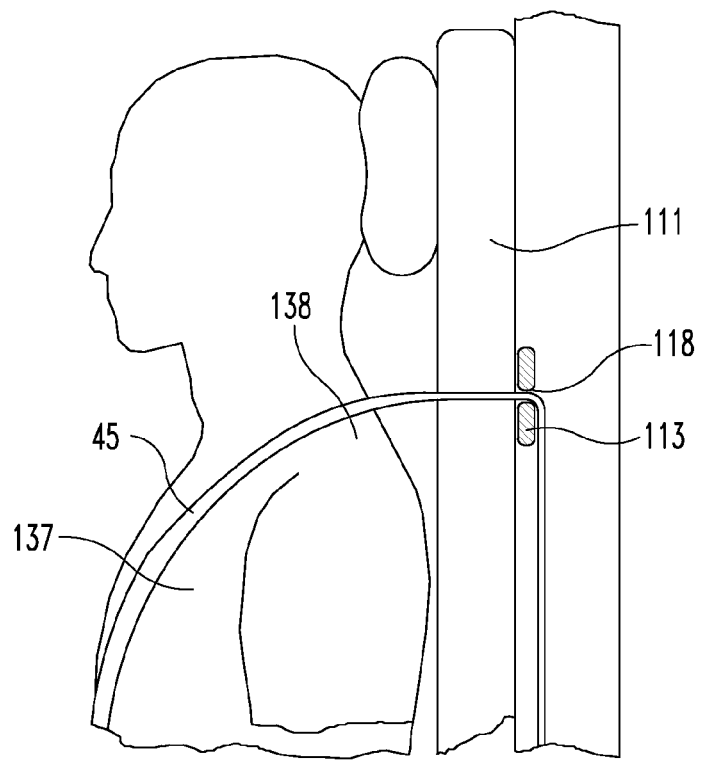
FIG. 15 is a fragmentary, side view of a person secured by the harness of FIG. 1 illustrating the positioning of the shoulder strap atop the person's shoulder.

In order to use the adjustment mechanism to correctly position the harness, the person is positioned atop back support 31 and seat support 32 with straps 44 and 45 being placed over the chest of the person. Tongues 46 and 47 are lockingly engaged with buckle 48 with the buckle 48 previously being located as illustrated in FIGS. 6-12. Buckle 48 is positioned between the legs of the person at an appropriate location depending upon the length of the person. Distal end 139 of strap 129 (FIG. 14) is then pulled outwardly away from adjuster 131 while the adjuster is pivoted in a counterclockwise direction as illustrated in FIG. 14 allowing strap 129 to pull on t-bar 127. Straps 44 and 45 are thereby pulled in the direction of arrow 124 (FIG. 4) with slide plate 113 moving in the same direction. Spool 123 is operable to allow strap 122 to extend thereby allowing movement of plate 113 in the direction of arrow 124. Eventually, straps 44 and 45 will be positioned atop the shoulder of the person resting against the back support. FIG. 15 illustrates the positioning of strap 45 against the top of the shoulder 138 of person 137 when the distal end 139 of strap 129 is pulled outwardly from the adjuster 131 until straps 44 and 45 are tight. Simultaneously, slidable plate 113 is aligned so that slot 118 of the movable plate is aligned with the top of the shoulder 138 of person 137 positioned against the back support. At this time, the handle of adjuster 131 pivots back to frictionally engage and hold strap 129 in place with straps, 129, 44 and 45 being in a taut position securely holding the person to the restraint. Once plate 113 is positioned behind the shoulders of the person, straps 44 and 45 extend generally parallel with each other against the tops of the shoulders and are generally perpendicular to back support 31 limiting movement of the person in the direction of the length of support 31.

The slidable plate 113 automatically moves the shoulder straps 44 and 45 away from the shoulders of the person whenever adjuster 131 is pivoted to release strap 129 since spool 123 pulls the plate upwardly. Thus, the problem inherent with prior devices is avoided whereat the straps simply rest against the person even though they are in the unlocked position since plate 113 pulls the straps off the shoulders. Adjuster 131 provides an adjustment means connected via strap 129 to the pair of straps 44 and 45 and is operable when the adjuster cam is pivoted away from strap 129 to allow a selected amount of extension of straps 44 and 45 thereby loosening the straps. Further, adjuster 131 is operable when end 139 of strap 129 is pulled away from the adjuster to allow a selected amount of retraction of strap 129 and thus, straps 44 and 45 to tighten the straps. Once the cam of the adjuster is in contact with strap 129, the adjuster will not allow extension of strap 129 until pivoted away from the strap.

Figure 16:
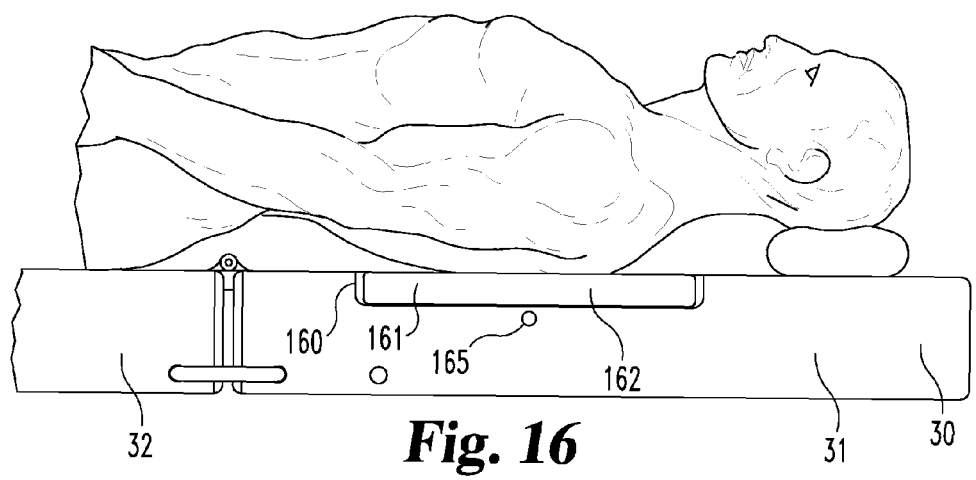
FIG. 16 is a fragmentary, enlarged, side view of a person resting on the restraint of FIG. 1 with the side lateral support in the downward, non-use position.
Figure 17:
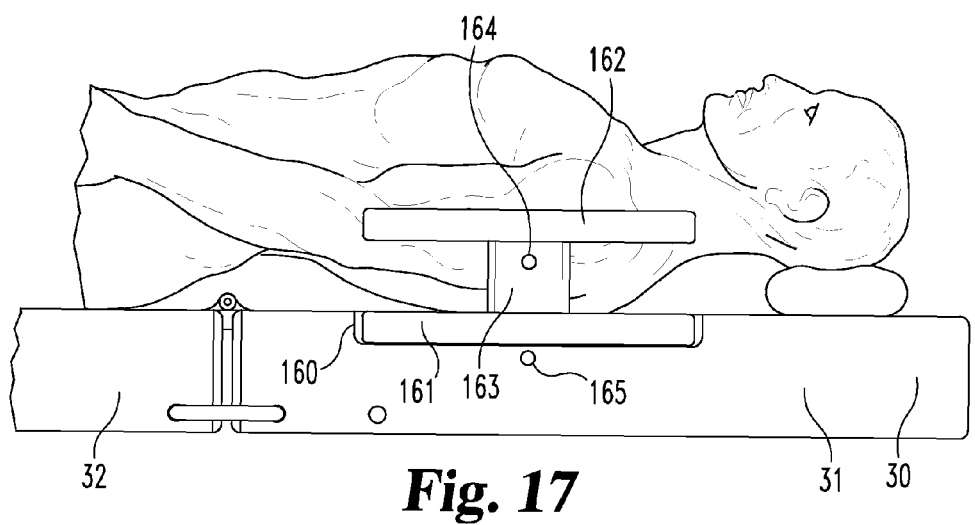
FIG. 17 is the same view as FIG. 16 only illustrating the side lateral support in the upward position.

In order to further limit movement of the person atop restraint 30 (FIGS. 16 and 17), a pair of raiseable/lateral supports are provided. One such lateral support 161 is shown in FIG. 16 and is normally positioned within recess 160 formed in the side of back support 31. An identical lateral support is provided on the side of back support 31 opposite of the lateral support 161. Lateral support 161 includes an elongated member 162 perpendicularly and fixedly joined to leg 163 having a plurality of apertures 164 extending therethrough. A captive push button pin 165 is movably mounted to support 31 having an inner end lockingly engageable with one of the apertures 164 of leg 163. By pulling elongated member upwardly adjacent the side of the person resting atop the back support, button 165 may then be depressed to lockingly engage with one of the apertures 164 of leg 163 holding the support in the upright position.

Figure 19:
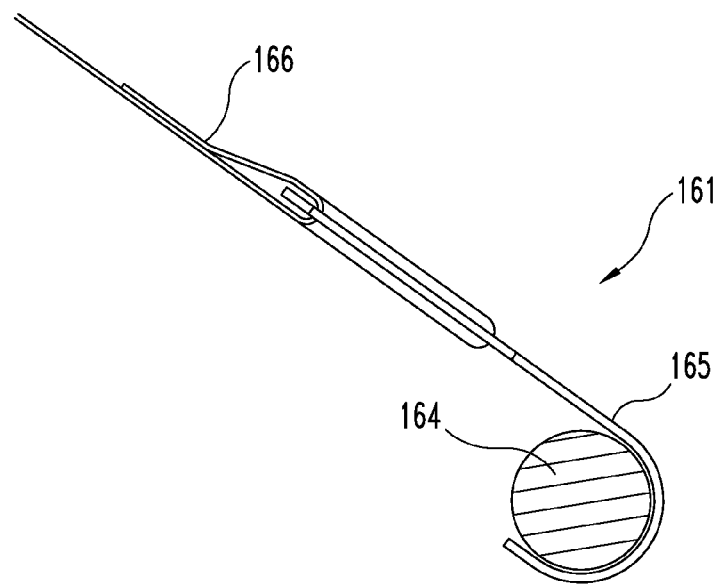
FIG. 19 is a fragmentary, enlarged, cross-sectional view taken along the line 19-19 of FIG. 18 and viewed in the direction of the arrows.

Restraint 30 may be built into a cot or gurney or may be removably mounted to the cot or gurney. Four connector combinations 160-163 (FIG. 1) are located at the four corners of restraint 30 with two of the connector combinations being secured to back support 31 and two of connector combinations being secured to seat support 32. Typically, a gurney includes a tubular frame surrounding the gurney perimeter. In the embodiment shown in FIG. 1, four connector combinations 160-163 are used to releasably hold restraint 30 to such a tube 164 (FIG. 19) of the gurney.

Connector combination 161 will now be described it being understood that an identical description applies to connector combinations 160, 162 and 163. Combination 161 includes a j-configured clamp 165 releasably engageable with tube 164. Strap 166 is secured to the end of clamp 165 and has a first locking device mounted to the opposite end of the strap. For example, end 167 (FIG. 1) of strap 165 is secured to a conventional tongue 168 that is releasably lockable with a conventional buckle 169 or second locking device mounted to back support 31. A variety of other means may be used to secure the restraint 30 to the cot or gurney it being understood that only one possible design of many designs is disclosed herein.

Figure 20:
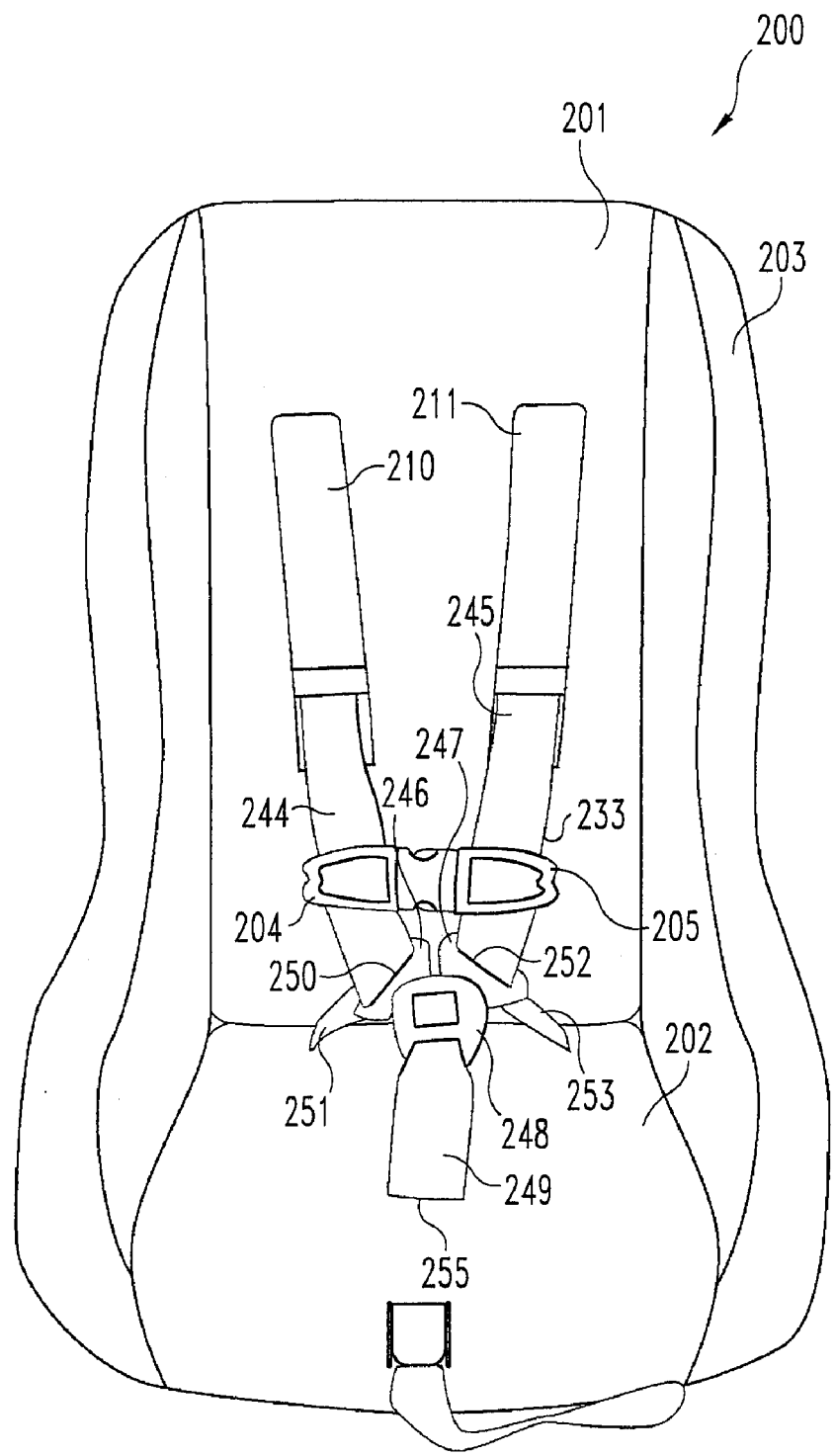
FIG. 20 is a front view of a child seat incorporating an alternate embodiment of the present invention.

An alternate embodiment of the present invention is shown in FIG. 20. Child seat 200 includes a main frame 203 having a back support 201 and seat support 202 for supporting a child there atop with the child seat then being installed atop the conventional seat of a vehicle and secured thereto in a conventional manner, such as, by straps and fastening devices. Seat 201 includes a harness 233 having the feature previously described for the preferred embodiment, namely a means for adjusting the shoulder straps to extend immediately atop the shoulders of the child positioned in the seat.

Harness 233 includes a pair of straps 244 and 245 that have proximal ends 251 and 253 fixedly secured to frame 203 at the location of seat support 202. Strap 244 extends from proximal end 251 slidingly through slot 250 of tongue 246 whereas strap 245 extends from proximal end 253 slidingly through slot 252 of tongue 247. Tongues 246 and 247 are identical to the tongues 46 and 47 previously described for the preferred embodiment. Both tongues are lockingly engageable with buckle 248 mounted to one end of strap 249 with the opposite end of the strap extending through aperture 255 and then secured to the frame 203 of the child seat. Buckle 248 and strap 249 are configured and mounted to the child seat in a manner identical to that previously described and shown for buckle 48 and strap 49 for the preferred embodiment.

Straps 244 and 245 extend upwardly from the tongues and then slidingly through a pair of quick disconnect harness clips 204 and 205 which are releasably lockable together to hold straps 244 and 245 relatively close together over the chest of the child positioned atop the seat. Harness clips 204 and 205 are commercially available and may take the form of the harness clips shown in U.S. Pat. No. 5,084,946 and U.S. Design Pat. D389,426 both of which are hereby incorporated by reference. Other harness clips may be employed with those incorporated by reference being listed as a matter of convenience.

Back support 201 includes a pair of slots 210 and 211 that extend through the seat thereby allowing straps 244 and 245 to extend to the back of the seat and freely and slidably through a slidably mounted bar 213 (FIG. 21) identical to plate 113 previously described.

Figure 21:
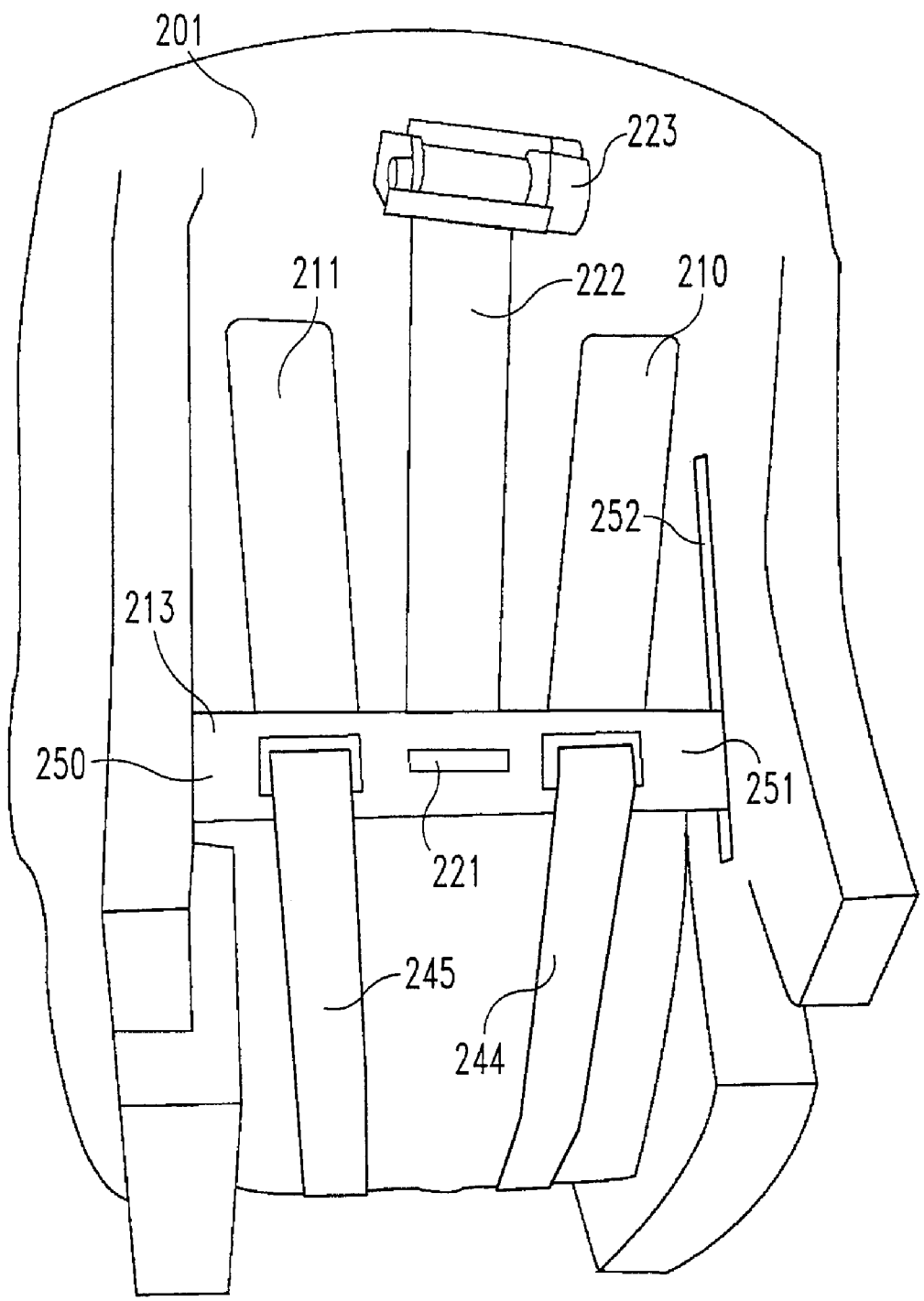
FIG. 21 is a rear perspective rear view of the child seat of FIG. 20.

A spring loaded spool 223 is mounted to the back surface of back support 201 and includes an extendable and retractable strap 222 having a distal end 221 secured to plate 213. Plate 213 includes a pair of opposite ends 250 and 251 slidably received in a pair of slots extending along the length of back support 201. For example, one such slot 252 is illustrated in FIG. 21 that slidingly receives end 251 of plate 213. An identical slot is located on back support 201 to slidingly receive end 250 of plate 213.

Figure 22:
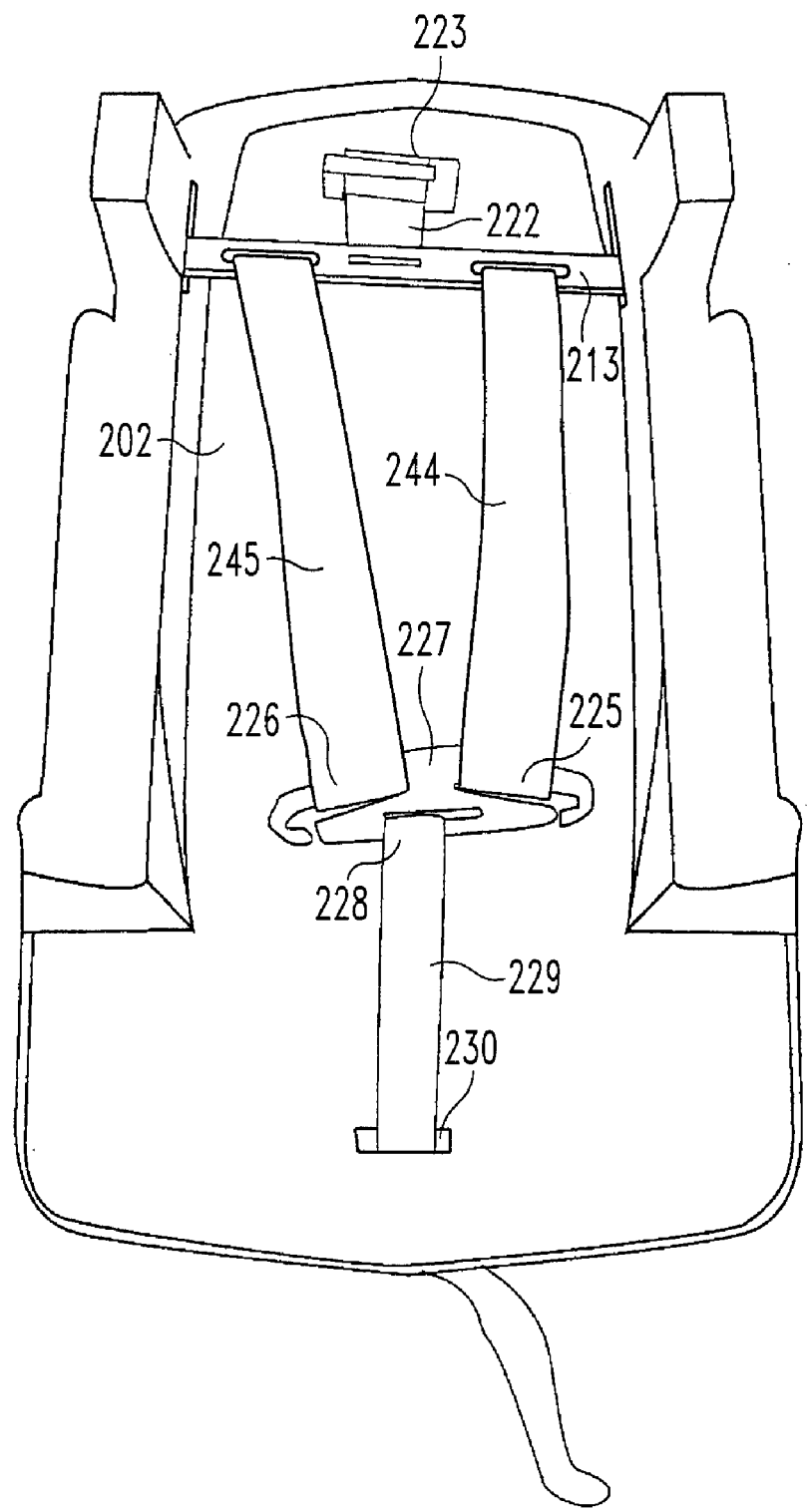
FIG. 22 is a bottom view of the child seat of FIG. 20

Straps 244 and 245 have ends 225 and 226 (FIG. 22) attached to t-bar 227 in a manner identically described for straps 44 and 45 with t-bar 227 being identical to t-bar 127. Strap 229 has a first end 228 attached to t-bar 227 and extends through hole 230 of seat support 202 allowing strap 229 to extend out through the front of seat where it is engaged with a web adjuster 231 (FIG. 23) identical to adjuster 131 previously described.

Figure 23:
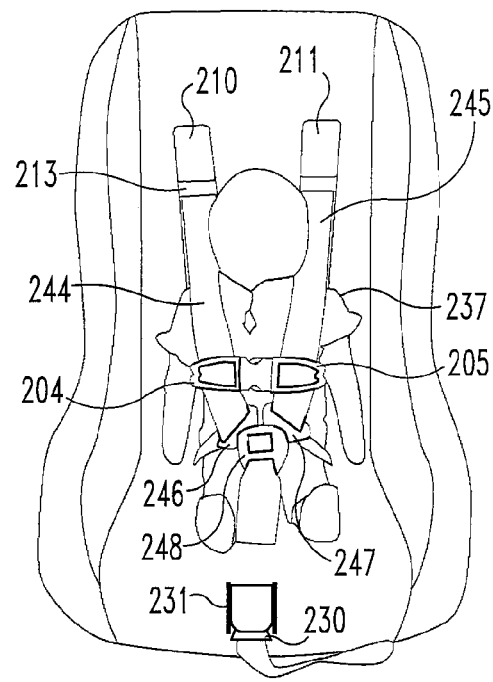
FIG. 23 is a front view of the child seat of FIG. 20 with the child positioned in the seat and the straps in the upward position spaced apart from the child's shoulders.
Figure 24:
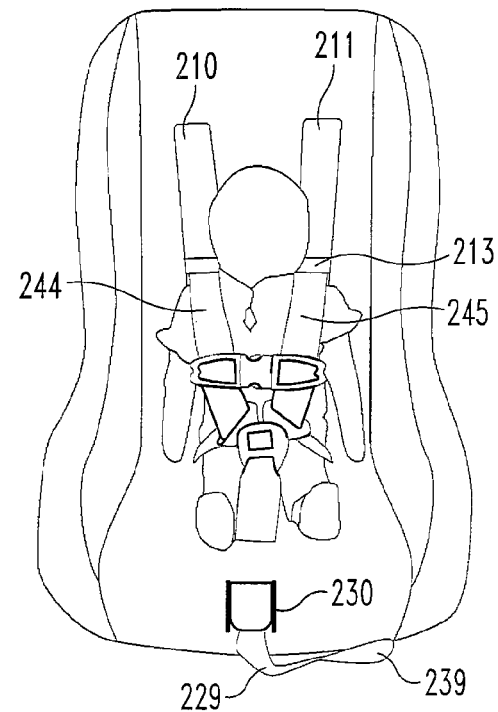
FIG. 24 is the same view as FIG. 23 only showing the shoulder straps in the downward position atop the child's shoulders restraining the child.

FIGS. 23 and 24 illustrate the positioning of the child before and after the harness is tightened. In FIG. 23, child 237 is placed atop the child seat beneath straps 244 and 245 with harness clips 204 and 205 engaged and tongues 246 and 247 engaged with buckle 248. Initially, slidable plate 213 is located near the tops of slots 210 and 211 and thus, straps 244 and 245 are spaced apart and above the child's shoulders. Distal end 239 (FIG. 23) of strap 229 is then grasped and pulled away from the child seat causing plate 213 to move toward the child's shoulders as strap 222 (FIG. 21) extends from spool 223. Eventually, plate 213 will be located immediately behind the child's shoulders and straps 244 and 245 will extend against the child's chest and over resting atop the child's shoulders (FIG. 24). In this manner, the harness is sized to the particular child placed within the seat.

Figure 25:
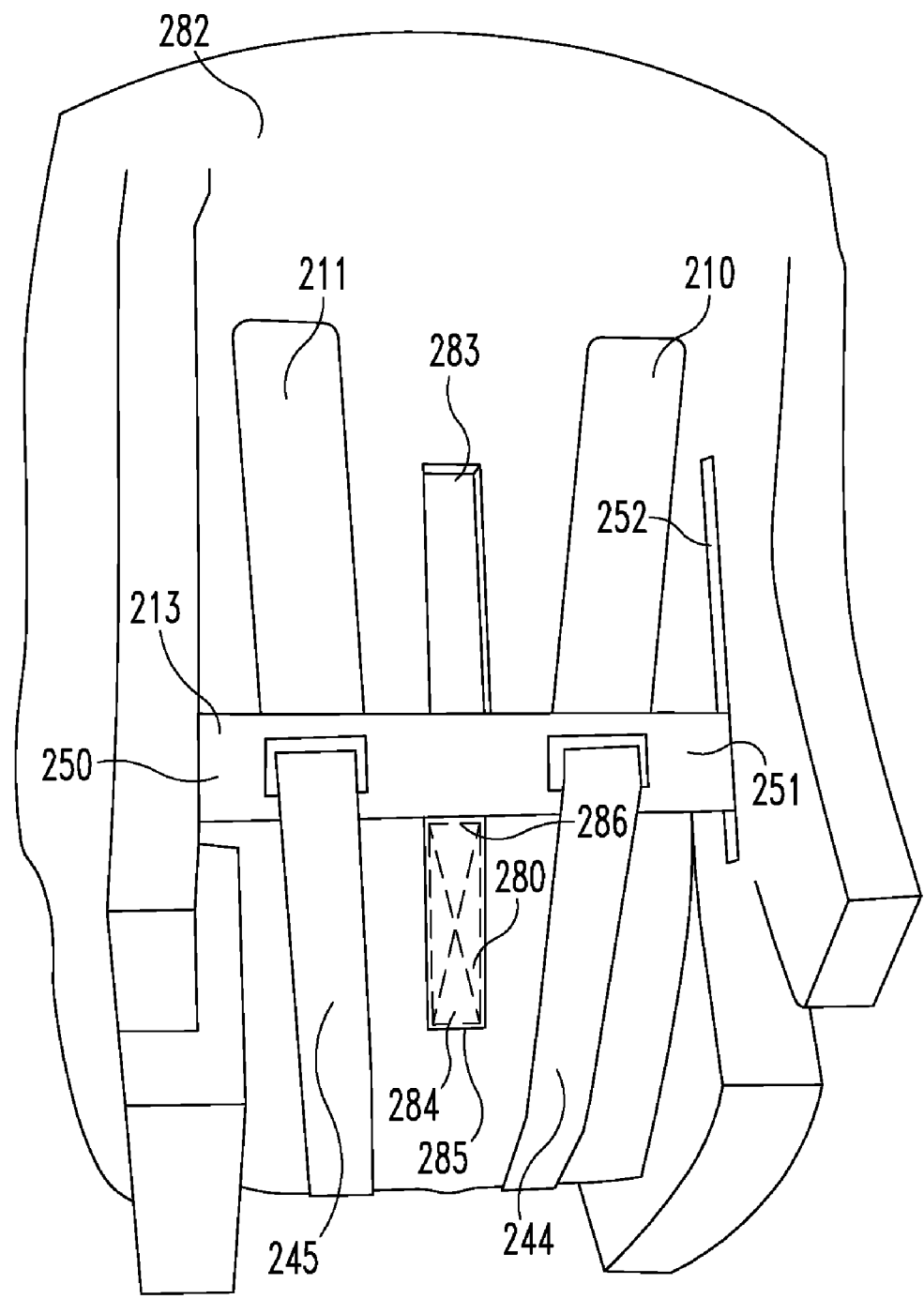
FIG. 25 is the same view of the child seat as FIG. 21 with the exception that a compression spring is used to move bar 213 in lieu of the spring biased spool.
Figure 26:
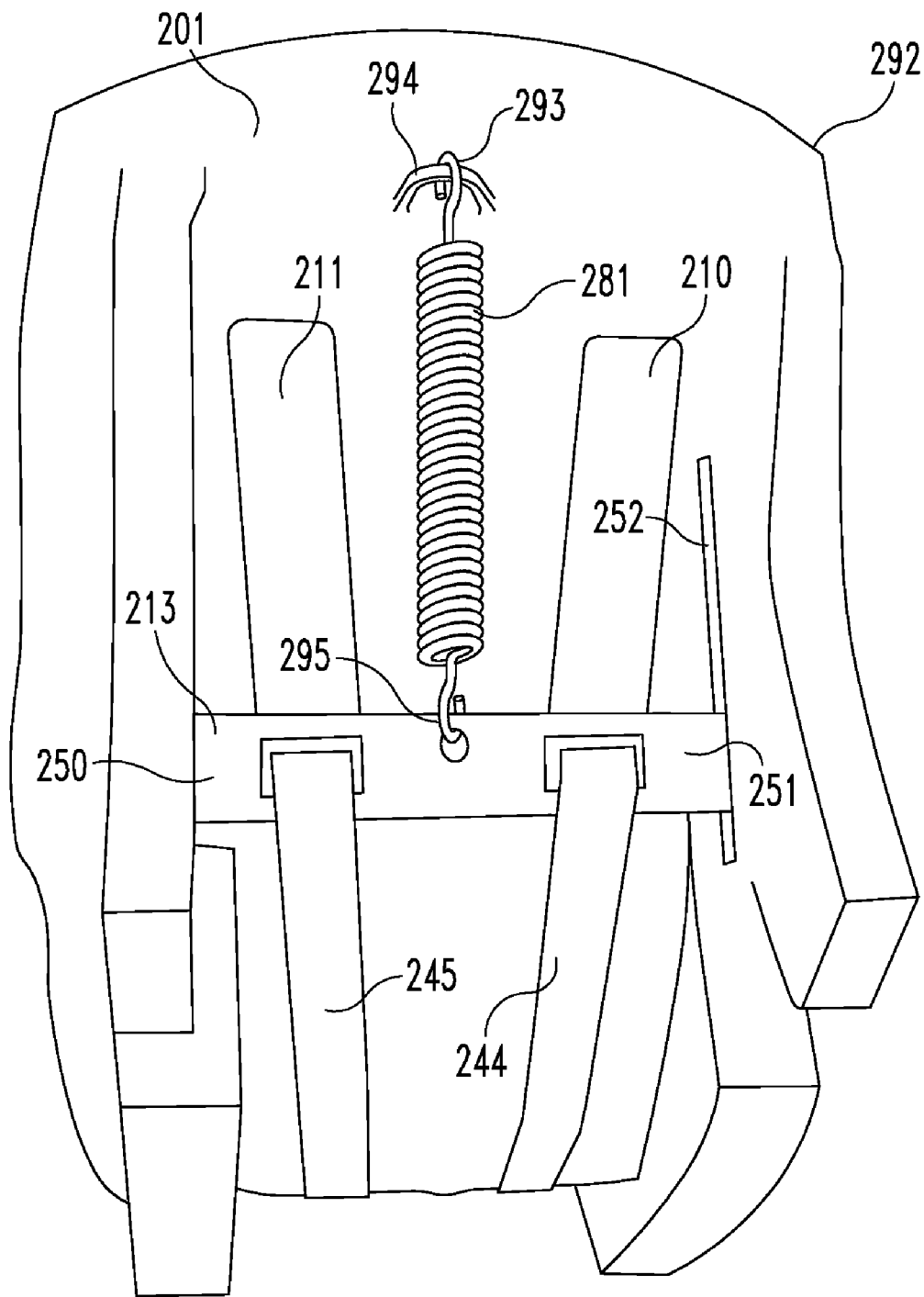
FIG. 26 is the same view as FIG. 21 with the exception that a tension spring is used to move bar 213 in lieu of the spring biased spool.

Many variations of the present invention are contemplated and included herein. For example, in lieu of using a spring biased spool 123 or 223 (FIGS. 4 and 21) to urge plate or bar 113 and 213 in turn moving the straps away from the person, a compression spring 280 (FIG. 25) or a tension spring 281 (FIG. 26) may be utilized.

Seat 282 (FIG. 25) is identical to seat 200 with the exception that a recess 283 is provided on the back side thereof with a compression spring 280 positioned therein to urge bar 213 to move the straps away from the person instead of by the spring biased spool. One end 284 of the spring contacts end 285 of recess 283 whereas the opposite end 286 of spring 280 is connected to or contacts bar 213 to urge the bar upwardly (as viewed in FIG. 25) in the same manner as described for seat 200.

Seat 292 (FIG. 26) is identical to seat 200 with the exception that a tension spring 281 is used to urge bar 213 to move the straps away from the person instead of the spring biased spool. One end 293 of the spring is connected to the back support 201 of seat 292 whereas the opposite end 295 of spring 281 is connected to the bar to urge the bar upwardly in the same manner as described for seat 200.

It is understood that although springs 280 and 281 are shown for use with seat 200, the same springs may be utilized with the emergency vehicle child restraint 30 FIG. 1) in same manner as described and illustrated with seat 282 or 292.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A restraint system for releasably holding a person on a support comprising:

a main frame for supporting a person positioned there atop, said main frame having a back support for supporting the back of said person, and a seat support for supporting the seat of said person, said back support includes a pair of guide slots with top ends and bottom ends which extend upwardly therebetween and through said back support, said back support further includes a pair of upwardly extending positioning slots with upper ends and lower ends;

a pair of shoulder straps extending outwardly from said back support positionable over said person;

shoulder strap connector means associated with said pair of straps;

a crotch connector mounted to said frame with said shoulder strap connector means and said crotch connector connectable together to releasably hold said shoulder straps to said crotch connector thereby limiting movement of said person;

adjustment means including a releasable lock and an adjustment strap extending through said lock and outwardly from said main frame with said adjustment strap connected to said shoulder straps with said adjustment means operable to allow a selected amount of extension and operable to allow a selected amount of retraction of said straps to respectively loosen and tighten said straps as said adjustment strap is respectively released and pulled and further operable to limit extension of said straps; and, shoulder strap positioning means having an elongated member with opposite ends extending into said pair of positioning slots and slidable between said upper ends and lower ends with said shoulder straps extending to said elongated member and a spring mounted to said main frame and engaged with said elongated member, said spring normally urging said elongated member to slide toward said upper ends of said positioning slots moving said shoulder straps toward said top ends of said guide slots away from said person when said adjustment strap is released to loosen a selected amount of said shoulder straps but allowing said elongated member to slide toward said lower ends of said positioning slots moving said shoulder straps toward said bottom ends of said guide slots against the shoulders of said person when said adjustment strap is pulled and tightened, said elongated member slidable from said lower ends to said upper ends solely as a result of force from said spring and said adjustment strap.

2. The restraint system of claim 1 wherein:

said releasable lock includes an adjuster frame and a spring biased cam pivotally mounted to said adjuster frame, said straps are connected together to said adjustment strap with said adjustment strap positioned adjacent said cam, said cam having a locking position limiting extension of said adjustment strap and said shoulder straps but allowing retraction of said adjustment strap and said shoulder straps and an unlocked position whereat said adjustment strap and said shoulder straps may be extended; and, said elongated member is a bar captive within said pair of positioning slots.

3. The restraint system of claim 1 wherein:

said shoulder strap positioning means includes a spring biased spool mounted to said main frame and an extendable tether connected to said elongated member through which said straps slidingly extend with said elongated member moving said straps away from the person when said tether is retracted.

4. The restraint system of claim 1 wherein:

said adjustment means includes an adjuster frame and a spring biased cam pivotally mounted to said adjuster frame, said straps are connected together into a single strap with said single strap positioned adjacent said cam, said cam having a locking position limiting extension of said single strap and said shoulder straps but allowing retraction of said single strap and said shoulder straps and an unlocked position whereat said single strap and said shoulder straps may be extended; and further comprising a connector with said straps and said single strap connected thereto.

5. A child seat comprising:

a back support having a slot with a top end and a bottom end;

a seat support together with said back support forming a child seat frame for supporting a child positioned there atop;

a harness mounted to said frame for securing the child to said frame, said harness includes a pair of straps extendable across the chest and shoulders of the child and extending through the back support at a first location aligned with the shoulders;

a slide slidably mounted via said slot to said frame and having said straps extending slidingly therethrough;

a first strap connected to said pair of straps and when pulled in a first direction tightens said straps against the shoulders of the child removing slack from said straps; and, a spring device connected to said slide and normally operable to move said slide in a second direction opposite to said first direction but yieldable to allow movement of said slide in said first direction, said spring device allowing said slide to move to said first location behind the shoulders.

6. The child seat of claim 5 wherein said spring device includes:

a spring biased spool mounted to said frame and a second strap extendable therefrom, said spool urging said second strap to move said slide on said back support to pull and position said straps apart from the shoulders of the child but yieldable to allow extension of said second strap when said first strap is pulled to tighten said straps whereat said straps are positioned against the shoulders of the child.

7. The child seat of claim 6 wherein:

said child seat includes a front and back and a pair of slots extending through said back support from said front to said back, said pair of straps extend from said front through said pair of slots and then extend slidably through said slide located on the back, said pair of straps extend from said slide toward said first strap whereat said pair of straps are connected to said first strap.

8. The child seat of claim 7 wherein:

said first strap extends from said pair of straps though said seat support from said front to said back; and further comprising:

a strap lock mounted to said seat support on said front and releasably engageable with said first strap.

9. The child seat of claim 8 and further comprising:

first locking means mounted to said pair of straps and second locking means mounted to said seat support, said first locking means and said second locking means are releasably engageable together to releasably hold said pair of straps, said second locking means being movably mounted to said seat support to vary the spacing and location of said second locking means relative to said seat support.

10. The child seat of claim 5 wherein said spring device includes:

a spring mounted to said seat frame and normally operable to move said slide with straps away from the person but yieldable to allow said slide with straps to move against the person.

11. A restraint system for releasably holding a person on a support comprising:

a main frame for supporting a person positioned there atop, said main frame having a back support for supporting the back of said person, and a seat support for supporting the seat of said person;

a pair of shoulder straps extending outwardly from said back support positionable over said person;

shoulder strap connector means associated with said pair of straps;

a crotch connector mounted to said frame with said shoulder strap connector means and said crotch connector connectable together to releasably hold said shoulder straps to said crotch connector thereby limiting movement of said person;

an adjustment strap connected to said shoulder straps;

a lock mounted on said main frame with said adjustment strap extending therethrough with said lock being releasable to allow a selected amount of extension and a selected amount of retraction of said adjustment strap to respectively loosen and tighten said shoulder straps and further operable to limit extension of said straps; and, a slide mounted to said back support with said shoulder straps slidably extending therethrough; and, a spring connected to said slide and normally urging said slide upwardly but yieldable to allow said slide to move downwardly, said spring allowing said slide to move to a first location when said strap adjustment is pulled positioning and tightening said shoulder straps against the person supported on the support.

12. The restraint system of claim 11 wherein:

said back support and said seat support form a child vehicle seat.

* * * * *